US011673080B2

United States Patent
Dolan

(10) Patent No.: US 11,673,080 B2
(45) Date of Patent: Jun. 13, 2023

(54) FLUID FILLING DIVERTER AND COLLECTOR APPARATUS

(71) Applicant: Michael F. Dolan, Manasquan, NJ (US)

(72) Inventor: Michael F. Dolan, Manasquan, NJ (US)

( * ) Notice: Subject to any disclaimer, the term of this patent is extended or adjusted under 35 U.S.C. 154(b) by 105 days.

(21) Appl. No.: 16/893,391

(22) Filed: Jun. 4, 2020

(65) Prior Publication Data
US 2021/0379510 A1 Dec. 9, 2021
US 2022/0266175 A9 Aug. 25, 2022

Related U.S. Application Data

(60) Provisional application No. 62/857,266, filed on Jun. 4, 2019.

(51) Int. Cl.
*B01D 29/90* (2006.01)
*B01D 35/00* (2006.01)
*B67C 11/02* (2006.01)

(52) U.S. Cl.
CPC ........... *B01D 29/90* (2013.01); *B01D 35/005* (2013.01); *B67C 11/02* (2013.01); *B01D 2201/4069* (2013.01); *B01D 2201/4092* (2013.01)

(58) Field of Classification Search
CPC .................. B01D 29/90; B01D 35/005; B01D 2201/4069; B01D 2201/4092; B01D 29/15; B01D 36/001; B67C 11/02; B67C 2011/027
USPC ....... 210/456, 455, 244, 249, 248, 250, 251, 210/304–306, 308, 309, 440, 443, 473; 141/285, 286, 297–300, 59, 98, 364
See application file for complete search history.

(56) References Cited

U.S. PATENT DOCUMENTS

| 5,381,839 | A | * | 1/1995 | Dowd | B65B 3/30 |
| | | | | | 141/237 |
| 5,445,196 | A | * | 8/1995 | Tyree, Jr. | B67C 11/00 |
| | | | | | 141/297 |
| 5,819,822 | A | * | 10/1998 | Schneider | B01D 36/001 |
| | | | | | 141/285 |
| 6,571,836 | B2 | | 6/2003 | Ephraim et al. | |
| 2002/0189710 | A1 | | 12/2002 | Ephraim et al. | |

* cited by examiner

*Primary Examiner* — Madeline Gonzalez
(74) *Attorney, Agent, or Firm* — Alexis Saenz

(57) ABSTRACT

Apparatus that makes it possible to prefill spin-on filter cartridges by allowing users to easily pour fluid only into the filter cartridge input port holes. Particularly useful for applications where introducing contaminants downstream of the filter can be detrimental to the system the filter protects.

9 Claims, 18 Drawing Sheets

FLUID FILLING DIVERTER AND COLLECTOR APPARATUS

CROSS-REFERENCE TO RELATED APPLICATIONS

Provisional Patent Applications covering the invention described herein were filed on Jun. 4, 2019, (assigned Ser. No. 62/857,266).

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

NOT APPLICABLE

BACKGROUND OF THE INVENTION

Field of the Invention

This invention relates to specialized fluid pouring tools used primarily for pre-filling automotive style thread on filter cartridge assemblies.

Description of the Related Art

Many Internal combustion engines utilize thread on filter cartridge assemblies for removing contaminates from fluid mediums including fuel oil and lubricating oil. When changing these filters, it is often desirable to prefill the cartridge assembly with the appropriate fluid. The filter cartridge input port holes are setup as a series of small holes arranged on a larger circle pattern. The small holes on the larger circle pattern can make proper prefilling by pouring fluid into the input holes messy and difficult. Typical conical funnels are either too small to flow efficiently or too large to fit the filter input port holes. This invention discloses a tool that can work on varying filter cartridge sizes that facilitates directing poured fluid towards only the input port holes. Without this type of a tool many mechanics will prefill filter cartridges through the filter output port thereby potentially introducing contaminated fluid to areas of the engine that the filter is designed to protect.

OBJECTS OF THE INVENTION

The object of the invention is to provide a tool that makes it convenient to pour fluid into the input port holes of various sizes of automotive style thread on filter cartridge assemblies. This will thereby improve the quality of engine maintenance work particularly on diesel fuel oil systems where the fuel injections systems are sensitive to fuel oil particulates.

SUMMARY OF THE INVENTION

Many internal combustion engines and other machines require filters for lubricating fluids including oil and fuel oil. Filter cartridges need to be changed regularly. Many mechanics prefer to pre-fill filter cartridges before re-installing to ensure the machine or engine is not starved of fluid at start up. Many fuel oil filters on diesel engines require a pre-filling. Some engines are equipped with pumps to facilitate the pre-filling of fuel oil filters. These pumps are typically low displacement manual pumps and pre-filling with these types of pumps can therefore be a time-consuming process. Many mechanics will manually pre-fill filter cartridges before installing them to remove or reduce the need to utilize the filter pre-fill pump. It is important to fill a filter cartridge in the proper flow direction otherwise contaminants from the filling fluid or container can be introduced downstream of the filter element. This could have the effect of introducing contaminants to the machine's fluid delivery system that could damage or clog components. Common filter cartridges can be difficult to pre-fill so that contaminants are not introduced on the downstream side of the filtration element. This invention disclosure describes a single apparatus that would be adaptable to pre-fill different filter cartridge sizes by only introducing fluid on the upstream ports of the filter.

Filter cartridge assemblies normally have a polar array of smaller input port holes that surround a larger output port hole. Because of the close proximity of these holes, it can be difficult to direct the flow from a pouring spout to only the smaller input port holes. The fact that these holes are typically smaller makes it even more difficult to direct flow into these holes without risking an overflow or spill into the larger output port hole. Mechanics can prevent fluid from going into the output holes by blocking this hole with a cap or plug. However, it can be difficult to find the right size plug or cap. Also, even when the output port hole is capped or plugged, it is still difficult to direct poured fluid into the smaller array of input holes without having it spill over the side of the filter assembly.

This invention disclosure describes an apparatus that will allow a controlled directing of poured fluid into the input port holes of a filter cartridge assembly. It also describes adaptable features for fitting many filter sizes that can collect and direct fluid while simultaneously obstructing the output port hole of the filter cartridge assembly. This ensures that fluid is only directed to the upstream input ports of the filter assembly.

BRIEF DESCRIPTION OF THE DRAWINGS

These and other potential combinations of embodiments of this invention will be more clearly understood from the following descriptions, taken in conjunction with the accompanying drawings, in which.

FIG.

DETAILED DESCRIPTION OF THE INVENTION

The preferred embodiments of this invention will be disclosed in the following descriptions. While some preferred embodiments are described, the disclosure should be limited by the claim set rather than the preferred embodiments that are utilized to illustrate some of the potential embodiments that this invention disclosure makes obvious to those skilled in the art. For illustrative purposes each of the views described are shown with a partial section view. Features should be understood to be oriented polarly about the center axis. For each figure features could be scaled proportionately about the center line, or they may alternatively be scaled differently about other sections to accommodate varying filter sizes with one apparatus. Alternatively, any of the scalable features in the sections defined, could be selectively combined into one apparatus to allow a single apparatus that has one or many of the defined sections and features. Preferred embodiments would be most economically produced with a plastic injection molding or thermoforming process. Manufacturing processes such as forming, drawing, overmolding, blow molding, rotomolding, printing and machining would also be economically suitable manufacturing techniques for the disclosed invention. The manufacturing process chosen will be obvious to those skilled in the manufacturing art once the disclosed geometry and its advantages are understood. Many plastic molding processes will require suitable draft angles, it should be understood that these features should be adjusted accordingly to meet the chosen manufacturing process requirements.

Figure 1:
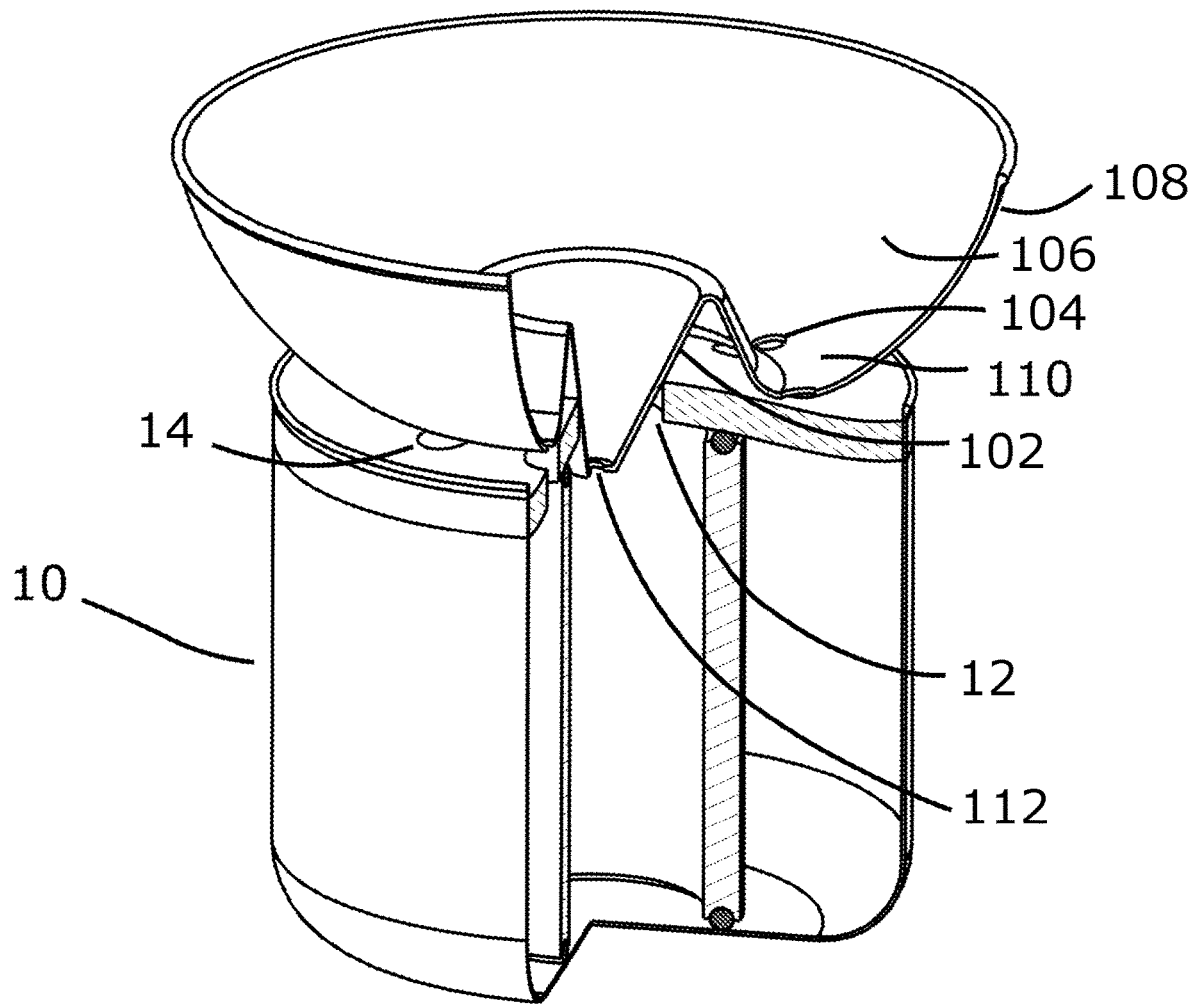
FIG. 1 illustrates an annular funnel arrangement with polarly oriented holes for directing pre-filling fluid to the input holes in the top of a spin-on style filter cartridge assembly. The center conical section of the device is used to both center the assembly on the filter cartridge and as a barrier to prevent fluid from entering the output port of the filter assembly.

FIG. 1 is a preferred embodiment of the apparatus with a quarter section removed in order to depict a sectional view of the internal components that this invention discloses. Item 10 is a typical spin-on filter cartridge assembly. Item 12 is typical output hole in the center of a filter cartridge assembly. Item 14 are the typical input holes or slots on a filter cartridge assembly. Item 108 is a funnel assembly. Item 102 depicts a locator surface with a conical external form that would allow funnel assembly 108 to locate in item 12 filter cartridge assembly output hole. Locator Surface 102 would also block or obstruct fluid that could otherwise flow into the output port 12. Item 104 is a polar oriented array of holes or slots for directing fluid poured into funnel assembly 108 toward filter input holes 14. Item 106 is a flow guiding feature that directs fluid poured into funnel assembly 108 toward the slots or holes 104. Item 110 calls out the area of the funnel used for collecting poured fluid and directing the poured fluid toward slot or holes 104. Item 112 is an optional vent for output hole 12.

Figure 2:
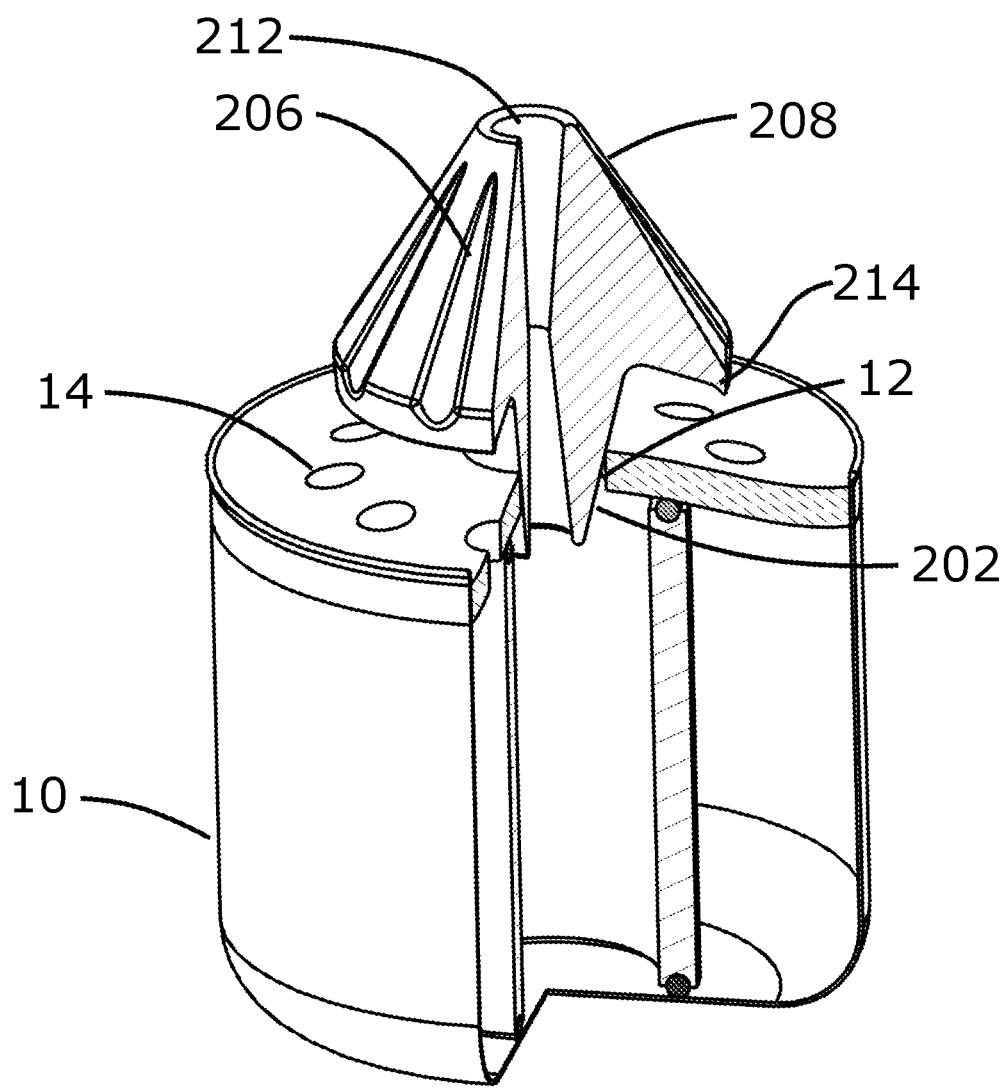
FIG. 2. illustrates a diverter mechanism to prevent poured fluid from entering the filter cartridge assemblies output ports and to direct poured fluid to the input port holes.

FIG. 2 depicts item 208 which is a preferred embodiment for a formable, moldable or machinable flow diverter of the disclosed invention installed on a filter cartridge assembly 10. Item 208 could be produced from foam or plastic or a composite of both materials. Item 202 is a conical locator and flow obstructing surface of item 208. Item 206 is a rounded, faceted, conical or spherical formed series of grooves for directing poured fluid toward filter input holes 14. Item 212 is an optional through hole in item 208 that is positioned to allow air to vent through output hole 12 during filling of the filter assembly. Item 214 is an optional protruding feature positioned on the external surface of item 208 that is designed to force a smooth laminar fluid flow from flow guiding surface 206 toward filter cartridge input holes 14.

Figure 3:
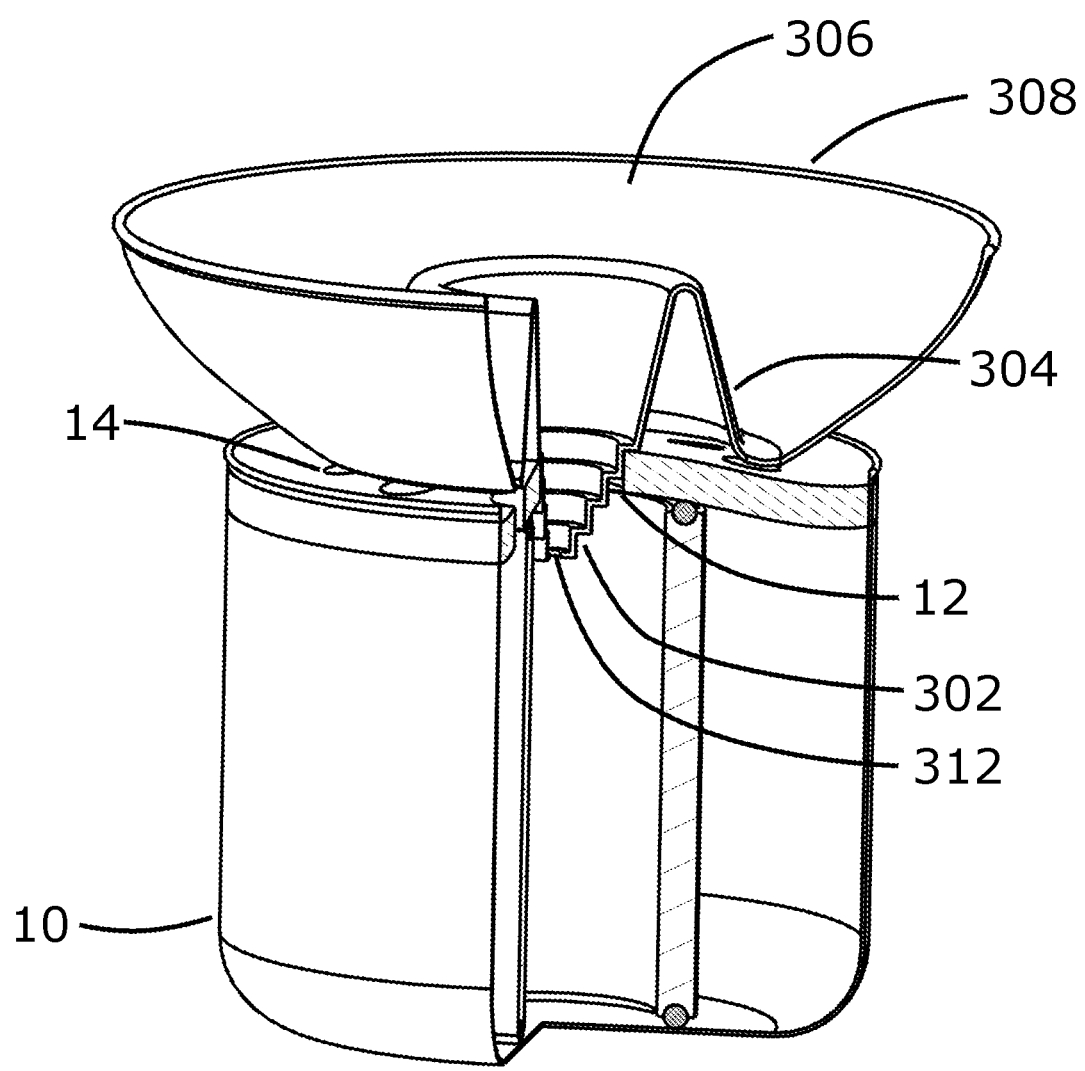
FIG. 3 illustrates an annular funnel arrangement with polarly oriented holes for directing pre-filling fluid to the input holes in the top of a spin-on style filter cartridge assembly. The center step conical section of the device is used to both center the assembly on the filter cartridge and as a barrier to prevent fluid from entering the output port of the filter assembly.

FIG. 3 is a partial section view of a potential alternative annular funnel shape embodiment of the apparatus disclosed by this invention installed on a filter cartridge assembly 10. Item 308 is a molded funnel assembly. Item 302 depicts a locator surface with many near cylindrical surfaces each with different diameter for interfacing multiple output hole port 12 sizes on a filter cartridge assembly. Locator Surface 302 also blocks or obstructs fluid that could otherwise flow into the output port 12. Item 304 is a polarly oriented array of holes or slots for directing fluid poured into funnel assembly 308 toward filter input holes 14. Item 306 is a flow guiding surface that directs fluid poured into funnel assembly 308 toward the slots or holes 304. Item 312 is an optional vent for filter cartridge output hole 12.

Figure 4:
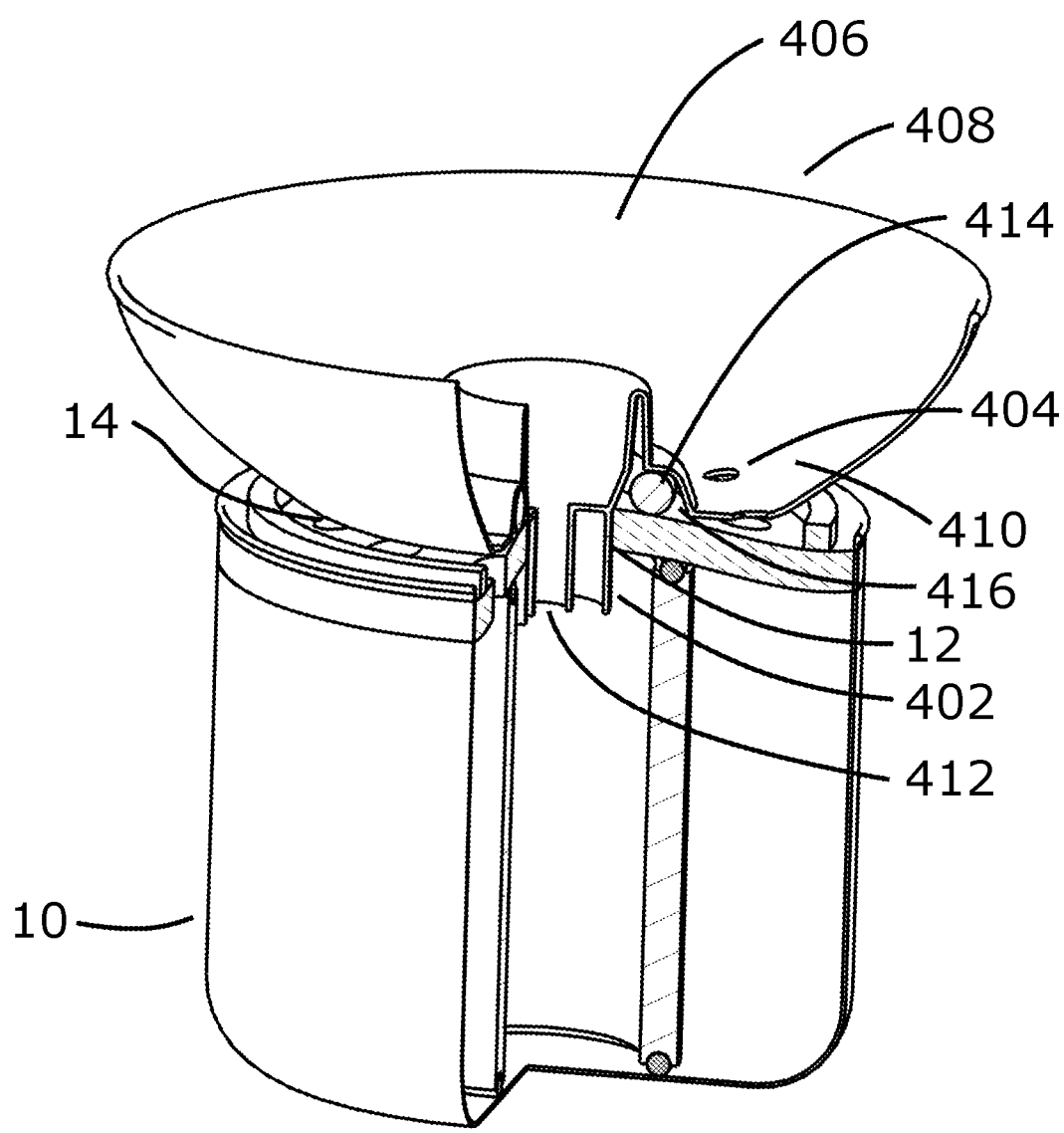
FIG. 4 illustrates an annular funnel arrangement with polarly oriented holes for directing pre-filling fluid to the input holes in the top of the spin-on style filter cartridge assembly. It includes an optional elastomeric seal that functions as fluid barrier between the input and output port holes of the filter cartridge.

FIG. 4 is a partial section view of a potential alternative annular funnel shape embodiment of the apparatus disclosed by this invention installed on a filter cartridge assembly 10. Item 408 is a molded or formed funnel assembly. Item 414 is a soft or elastomeric seal to prevent poured fluid from flowing from the input port 14 to output port 12. Item 402 depicts an optional locator surface for interfacing output port 12 on a filter cartridge assembly. Locator 402 could alternately or simultaneously be used to center seal item 414. Locator Surface 402 would block or obstruct fluid that could otherwise flow into the output port 12. Locator surface 402 could have many shapes including conical, cylindrical, spherical or thread geometries for interfacing output port 12. Locator 402 could also include a stepped external form. Item 404 is a polar oriented array of holes or slots for directing fluid poured into funnel assembly 408 toward filter input holes 14. Item 406 is a flow guiding feature that directs fluid poured into funnel assembly 408 toward slots or holes 404. Item 410 calls out the area of the funnel used for collecting poured fluid and directing the poured fluid toward slot or holes 404. Item 412 is an optional vent for filter cartridge output hole 12. Item 414 could vary in cross section to accommodate a simultaneous interface with funnel assembly 408 and with the filter cartridge assembly port 12 hole surface. Item 416 is an optional seal groove to accommodate seal 414. Seal 414 could also be located with optional locator 402, removing the need for seal groove 416. Multiple 414 seals could be included in varying cross sections or geometries to best accommodate a range of potential spin-on filter cartridges 10.

Figure 5:
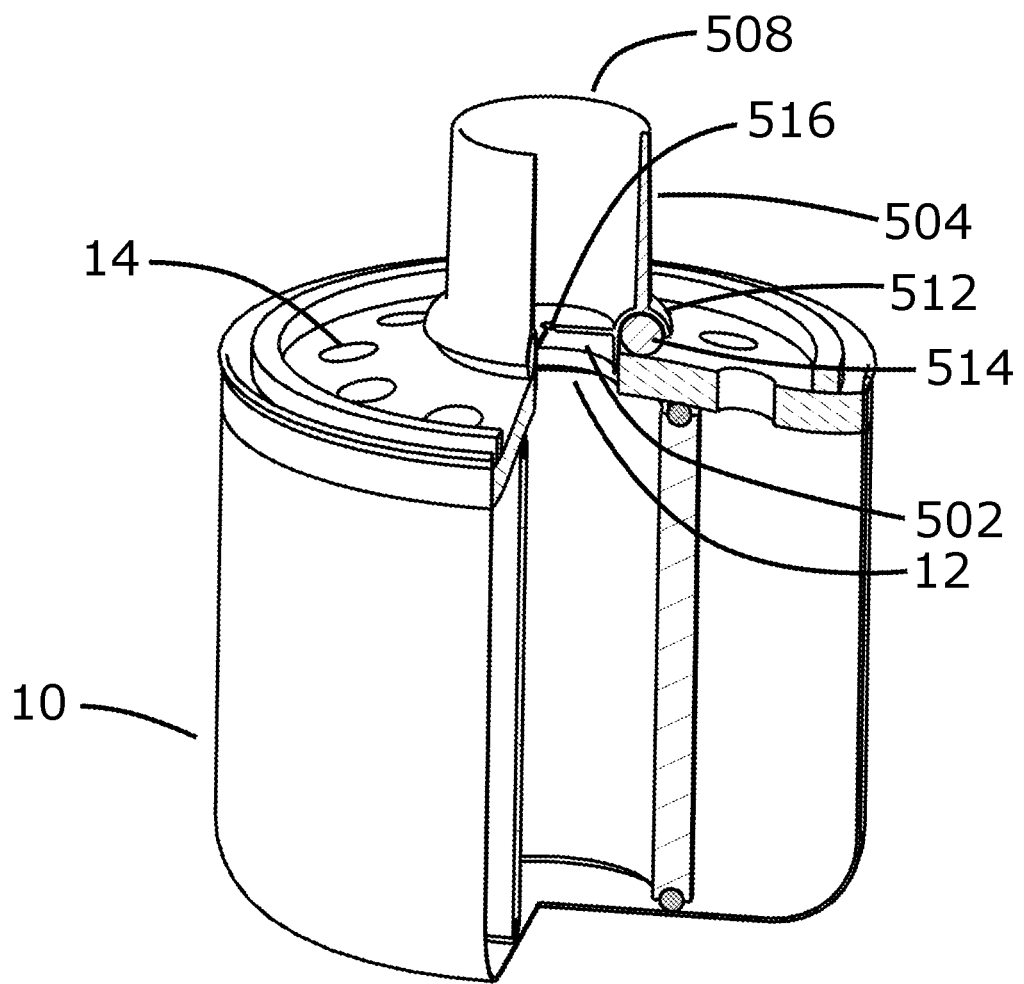
FIG. 5 illustrates an annular shaped diverter assembly that prevents fluid from flowing to the output port holes when poured over the input port holes. It includes an optional elastomeric face seal for preventing fluid from flowing toward the output port holes.

FIG. 5 is a partial sectioned view of a potential alternate embodiment of this disclosure installed on a filter cartridge assembly 10. Item 508 is a flow diverter assembly. Item 514 is a soft elastomeric seal for blocking the fluid flow path from input hole 14 to output hole 12. Item 508 is a moldable, formable, printable or machinable diverter that would direct fluid poured towards surface 504 towards input hole 14. Item 512 is an optional seal groove for seal 514. Both item 514 and item 516 could be produced with a variety of cross sections suited to fit the filter cartridge assembly 10 for intended use. Item 502 is a locator surface that could have any or a combination of conical, cylindrical, tapered, stepped or helical external geometries for interfacing output port hole 12. Item 516 defines an optional vent hole for the output port 12.

Figure 6:
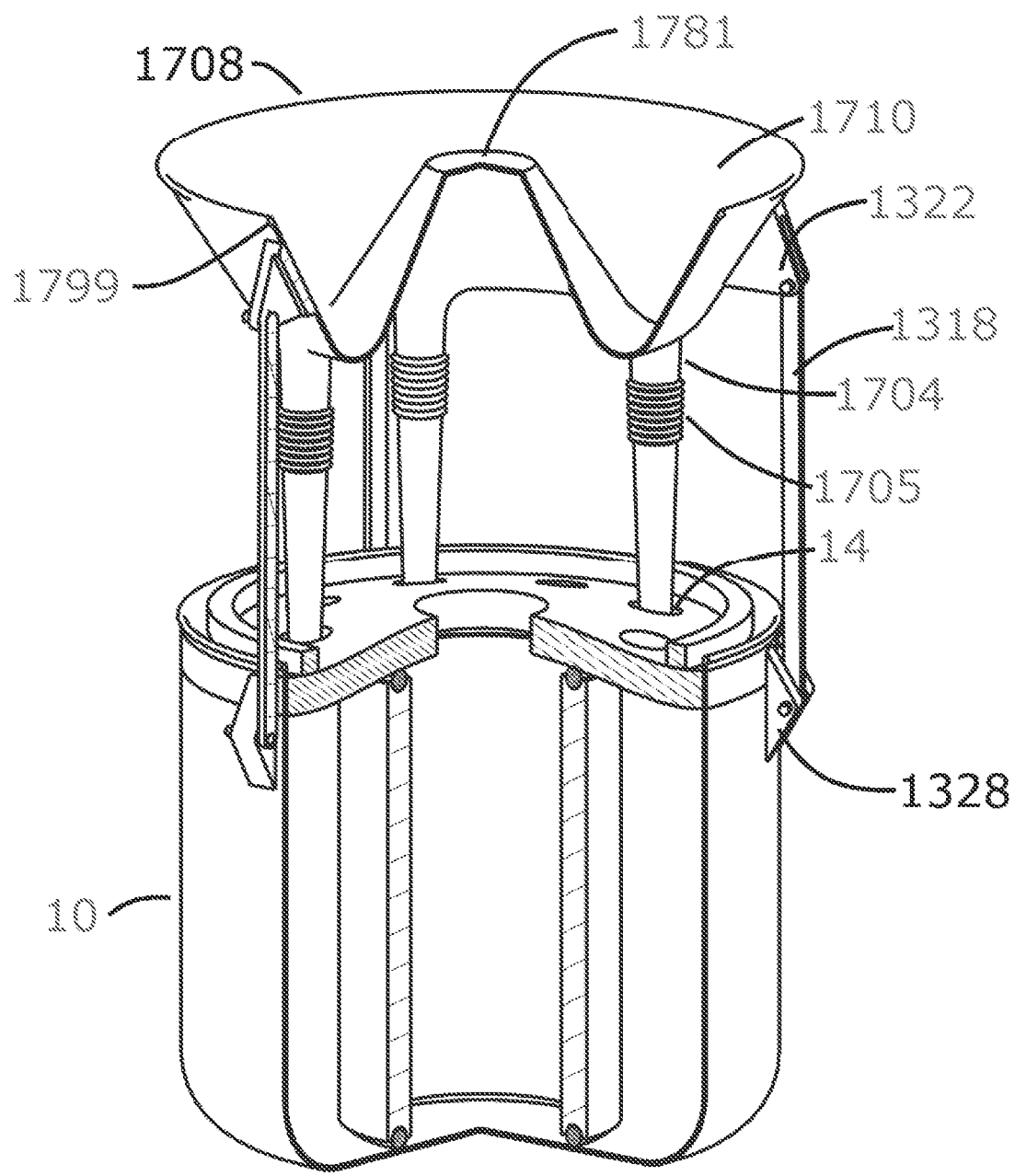
FIG. 6 shows a funnel apparatus; a filter assembly; and a latch holder in examples of the present disclosure.

FIG. 6 shows a funnel apparatus 1708; a filter assembly 10; and a latch holder 1318 in examples of the present disclosure. The latch holder 1318 comprises a first end and a second end opposite the first end. The first end is attached to the rim of the fluid collection member of the funnel apparatus 1708. The second end of the latch holder 1318 is attached to the filter assembly by a magnet 1328.

Figure 7:
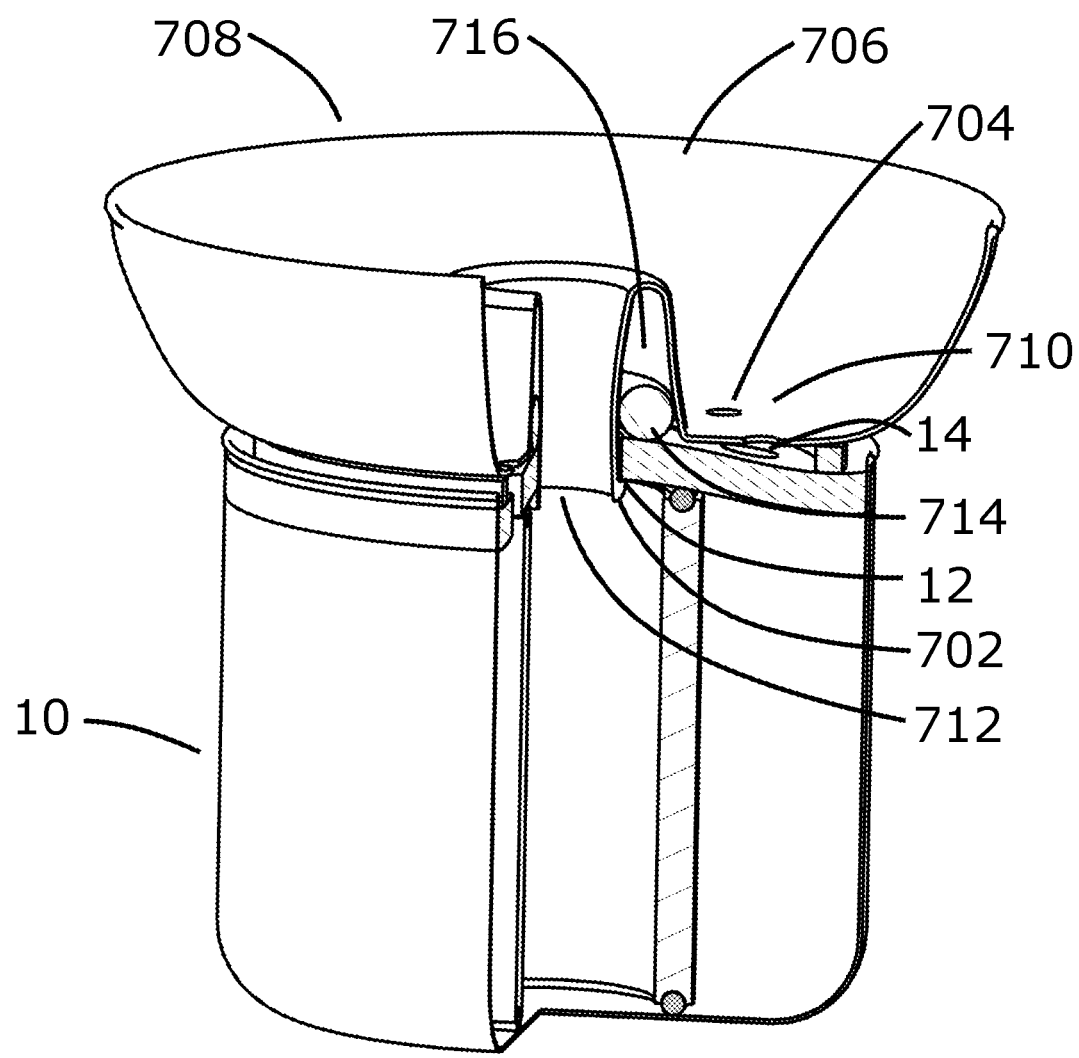
FIG. 7 illustrates an annular funnel arrangement with polarly oriented holes for directing pre-filling fluid to the input holes in the top of a spin-on style filter cartridge assembly. The center conical section that engages the center output port hole functions as a both a latching and a centering device. It includes an optional elastomeric face seal. The outside surface of the funnel assembly can also engages the filters outer face seal thereby preventing poured fluid from flowing down the side of the filter cartridge during filling.

FIG. 7 is a partial section view of a potential alternative annular funnel shape embodiment of the apparatus disclosed by this invention installed on a filter cartridge assembly 10. Item 708 is the funnel assembly. Item 702 shows the cross section of a flexible latching feature. Item 702 is produced from a flexible material and geometry that would deform when pressed into output hole 12 and would then allow latching to the underside surface of output hole 12. Item 702 could be comprised of a full annular section about the center axis or optionally could be interrupted with a polar array of vertical slots that would allow more flexibility of latch items 702. Item 708 is a moldable, formable, printable or machinable funnel that would direct fluid poured towards surface 706 to input hole 14. Item 704 is an array of polarly oriented slots or holes for directing poured fluid to input hole 14. Item 710 is the funnel collection area. Item 712 defines an optional area at the center of the funnel that has been left open to provide an optional vent hole for output port 12. Item 714 is an optional annular seal ring that rests in an optional seal ring groove 716. Both groove 716 and seal 714 can be made with any cross section and material that best allows them to mate and with the filter assembly 10 or the array of filter assemblies of intended use.

Figure 8:
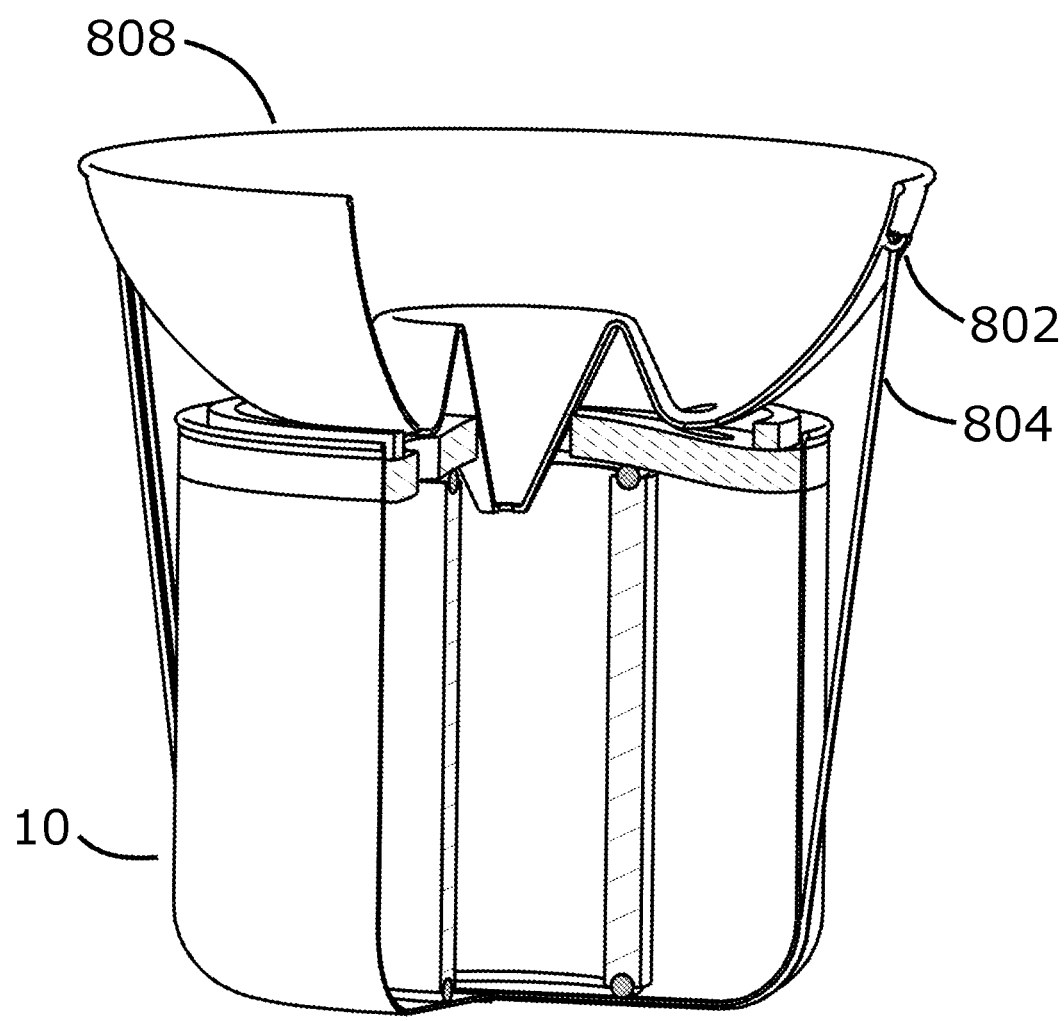
FIG. 8 illustrates an alternative elastic style banding system for securing an annular funnel to a filter cartridge assembly.

FIG. 8 is a partial section view of a potential alternative annular funnel shape embodiment of the apparatus disclosed by this invention installed on a filter cartridge assembly 10. Item 808 could be any of the potential funnel assembly embodiments derived from this patent disclosure. Item 802 is an attachment point comprised from a hook, loop, hole, eye, groove or slot or any combination of each for connecting a banding or strapping. Item 802 would be part of a plurality of polarly oriented identical features added to sections opposed to each other. A minimum of 2 Item 802 opposite each would be required. Item 804 is a band or strap of a stretchable elastic spring material that connects to item 802 and at least one identical item 802 feature on another section of the filter assembly 10. Item 804 will wrap around the bottom of the filter and will serve to retain Item 808 to Item 10 the filter cartridge assembly. Item 804 could be comprised from a loop shaped stretchable material that could be looped a plurality of times around Item 10. Item 804 could also be produced from a molded material that is stretchable and could exactly conform to a specific positional arrangement or quantity of item 802 features.

Figure 9:
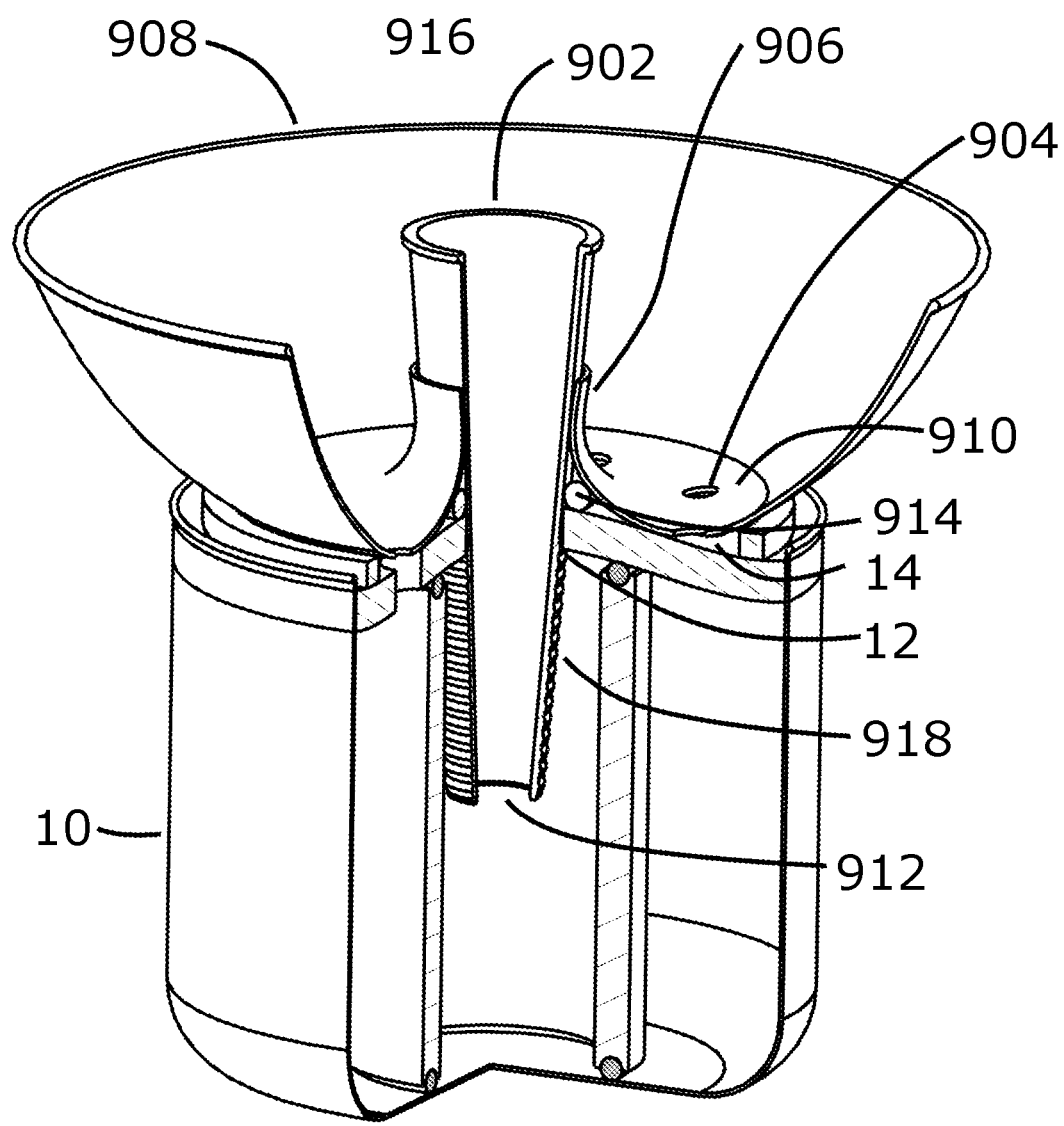
FIG. 9 illustrates an alternative two-piece annular funnel arrangement with polarly oriented holes for directing pre-filling fluid to the input port holes. The conical center piece secures the funnel assembly on the filter cartridge. An optional face seal is shown to further prevent pre-filling fluid from entering the output port hole.

FIG. 9 is a cross sectional view of a potential alternate embodiment of this disclosure. Item 902 is a conically shaped center locator. Item 902 could alternately have sections with external features 918 for mating with filter output hole 12 or funnel assembly 908 that are stepped, tapered, cylindrical, helical, spherical or with features for engaging helical thread geometries of output port 12. Item 908 is a fluid collection funnel. Item 906 is a thin wall section of item 908 that can conform to various diameters of item 902 as item 902 is translated through item 908 to simultaneously interface the inside diameter surfaces of item 12 and item 908. Item 906's thin section allows the inside diameter of 908 to vary for compliance with the varying diameter of item 902. Item 906 of item 908 could alternatively include slots, grooves or holes to facilitate a higher level of elasticity allowing a larger range of mating with item 902. Item 908 has a natural unloaded state that has a smaller inside diameter. Item 908 is produced from a polymeric and semi elastic material. In this figure item 908's thin section at area 906 is shown in an expanded position that has been created by forcibly translating the larger section of item 902 through item 908. Item 904 is an array of polarly oriented grooves, slots or holes for directing poured fluid to input hole 14. Item 910 is the fluid collection volume of funnel 908. Item 914 is an optional seal for blocking the fluid flow path from input hole 14 to output hole 12. Item 914 is shown as an elastomeric ring that is centered on item 902's external surface. Alternately item 914 could be bonded or molded permanently to the bottom surface of item 908. Seal item 914's cross section could alternatively be other than the round section shown.

Figure 10:
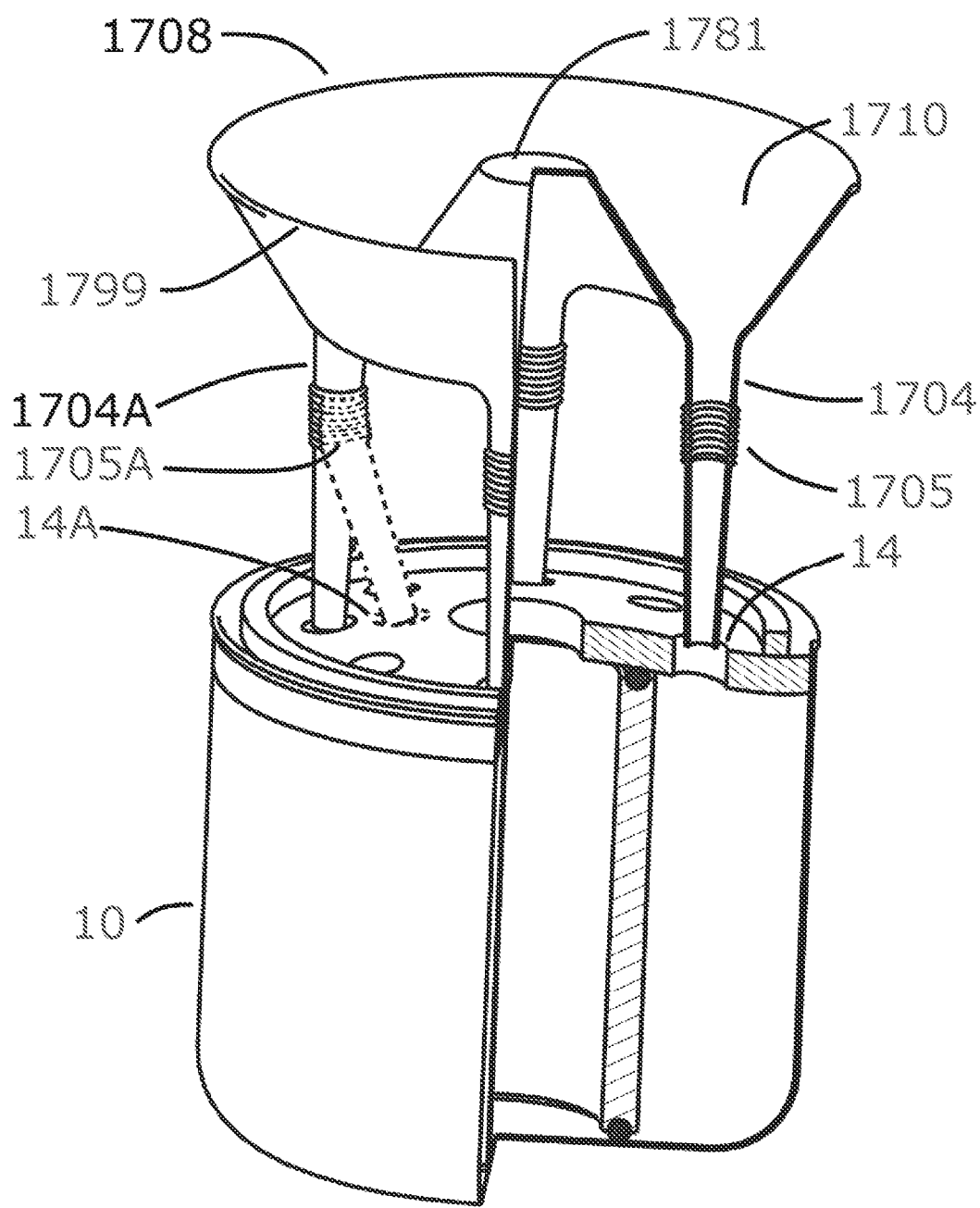
FIG. 10 shows a funnel apparatus mountable to different filter assemblies in examples of the present disclosure.

FIG. 10 shows a funnel apparatus 1708 mountable to different filter assemblies in examples of the present disclosure. The funnel apparatus 1708 comprises a rim 1799 and a central portion 1781. The funnel apparatus 1708 is characterized by a first mounting condition (shown in solid lines) and a second mounting condition (shown in dashed lines). In the first mounting condition, the funnel apparatus is mounted on a first filter assembly comprising a first plurality of input port holes 14. The first plurality of input port holes are equally spaced along a first circumferential perimeter. In the second mounting condition, the funnel apparatus is mounted on a second filter assembly comprising a second plurality of input port holes 14A. The deformed funnel runner channel tube 1704A, with bent item 1705A, is inserted into the input port hole 14A. The second plurality of input port holes are equally spaced along a second circumferential perimeter. A diameter of the first circumferential perimeter is larger than a diameter of the second circumferential perimeter.

Figure 11:
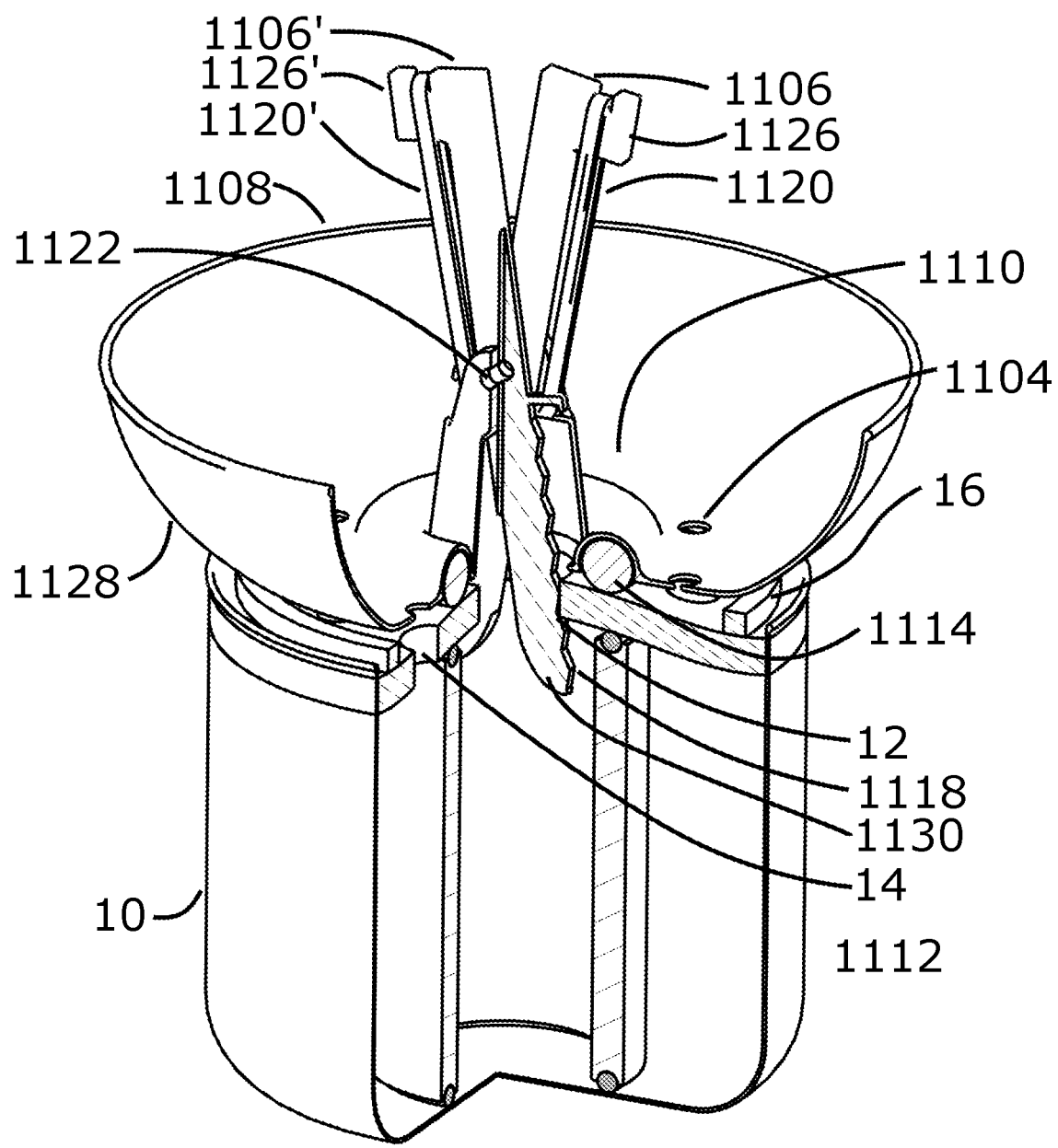
FIG. 11 illustrates an annular funnel arrangement with polarly oriented holes for directing pre-filling fluid to the input holes in the top of the spin-on style filter cartridge assembly. An elastically pre-loaded hinged fulcrum mechanism is shown as an alternative system for latching the mechanism to the output port hole. An optional elastomeric face seal is shown to further prevent fluid from flowing into the output port hole.

FIG. 11 is a partial sectional view of a potential alternate embodiment of this patent disclosure. Item 1108 is the funnel assembly. Item 1128 is a thin section funneling component produced from flexible material and shown after being pushed down from the top so its bottom surface is forced against filter seal 16. While item 1128 is pushed down against the top of the filter assembly 10, item 1128's inner bottom surface is forcibly pressed against the filter cartridges top surface. Optional seal 1114 would improve the ability of 1128's bottom inner surface to block fluid flow from input holes 14 to output hole 12 across the filter output hole bore's top surface. Optional seal 1114 could also be made from an elastic material to provide resistance to deformation while under load. Optional seal 1114 would preferably be affixed with an adhesive, a groove or it could be molded directly as a part of item 1128. Item 1106 and 1106' are fulcrum latches that pivot about fulcrum 1122. Fulcrum 1122 could be produced from a pin, post, hole, slot, groove, shoulder or any such feature that constrains the motion as a fulcrum would. Fulcrum 1106 and 1106' would pivot about 1122 independently or they could alternatively be set up with mating interfaces such as gears or racks that would force them to rotate against each other's movement. Item 1120 & 1120' are elastic straps, springs or bands used to preload fulcrums 1106 and 1106' by applying opposing tension to each end of 1106 and against the opposite and opposed end of 1106'. Elastic strap 1120 and 1120' could be alternately be replaced with another common device such as a torsional, compression or extension spring positioned on the assembly to create a similar preloaded position. Items 1118 are a hooking or latch like features on fulcrum latches 1106 and 1106'. Item 1118 could exist in pluralities and are designed to hook and latch the inside or underside of filter output port hole 12. Item 1130 is a tapered, round or relieved leading edge to allow fulcrum latches 1106 and 1106' to be closed as a result of downward pressure on filter assembly 1108. After downward force is applied to assembly 1108, seal 16 and optional seal 1114 will be engaged, while latches 1106 and 1106' will be sprung outward to lock in the engaged and sealed position of the assembly 1108. Item 1104 are holes or slots for directing fluid to filter input holes 14. Item 1110 is the funnel's fluid collection area. Item 1126 and 1126' are pads for allowing for a better grip when actuating and closing fulcrum latches 1106 and 1106' with human fingers.

Figure 12:
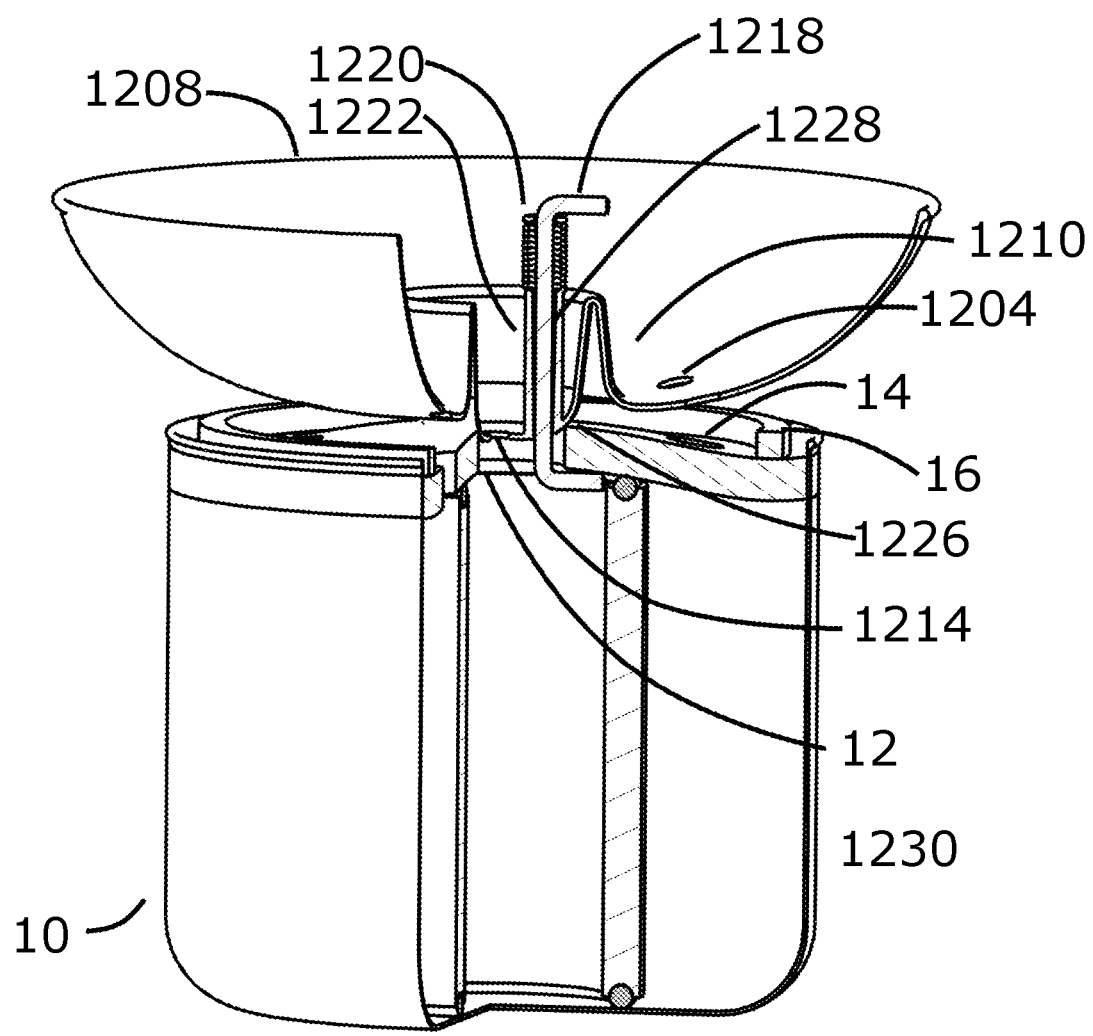
FIG. 12 illustrates an annular funnel arrangement with polarly oriented holes for directing pre-filling fluid to the input holes in the top of the spin-on style filter cartridge assembly. A potential spring-loaded latching mechanism consisting of a rotating lever and latch is depicted.

FIG. 12 is a sectional view of a potential alternate embodiment of this patent disclosure. Item 1208 is the funnel assembly. Item 1208 is made from a flexible material like plastic that has elastic properties. Item 1208 is shown after being pulled or pushed against the top of filter cartridge assembly 10. Item 1208's natural shape could also be designed to allow the bottom surface of funnel assembly 1208 to touch and press against filter seal 16. Item 1210 is the funnel like fluid collection area. Item 1204 is a funnel input port hole or slot for directing fluid from the funnel collection area 1210 to filter input hole 14. Item 1204 can exist singularly or in an array of polarly oriented features. Item 1222 is a post, pedestal or support structure that is part of filter assembly 1208. Item 1222 can exist singularly or in plurality. Item 1222 can be positioned anywhere within the funnel assembly 1208's upper surface. Item 1222 will hold and guide item 1218 a hooking or grabbing and retaining component. Item 1218 shown is a bent shaft that can be rotated about its long axis to create a grabbing or hooking effect thereby holding funnel assembly 1208 firmly against the top features of filter assembly 10. Item 1220 is an elastic compression component such as a spring used to create additional downward force on funnel assembly 1208 after the hooking and grabbing retainer 1218 is pressed down and rotated or otherwise latched to engage the internal or undersurface features of filter assembly output or input holes 12 or 14. Item 1226 is an optional seal or sealing surface connected by molding, adhesive or a groove that can gate the fluid flow path between input hole 14 and output hole 12 across these bore surface's external face. The hooking and grabbing action of item 1218 is actuated manually by pressing down on item 1218 and by rotating it by hand to create an axial interference with filter 10's input hole 14 or output hole 12's bore surface. The hooking and grabbing could be accomplished by also providing an internal guiding bore surface 1228 to fit tightly to 1218 while allowing post support 1222 to be sufficiently oversized with respect to the outside dimensions of hooking grabbing retainer 1218, thereby allowing item 1218 to fulcrum against the inside diameter of guide bore surface 1228. This will allow for any alternate means shown or described in this application to be used for latching the hooking or grabbing mechanism 1218 to the upper input hole 14 or output hole 12 bore's features. Item 1218 could alternately be magnetized or magnets could be attached to the ends that interface the filter cartridge assembly 10's top surface which would provide the hooking or grabbing function through a magnetic latch. Item 1214 is an optional vent that would allow air to escape filter output hole 12.

Figure 13:
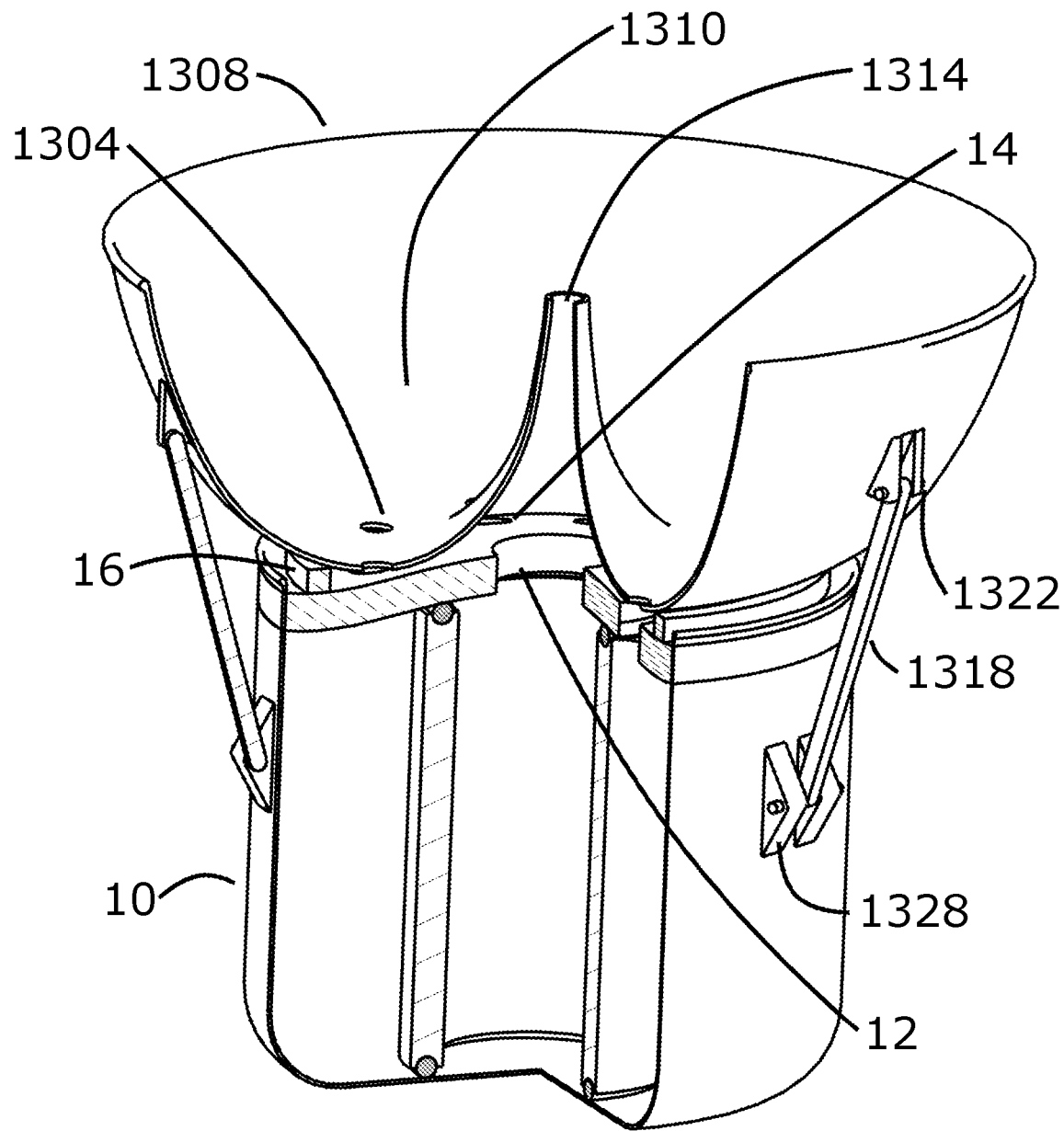
FIG. 13 illustrates an annular funnel arrangement with polarly oriented holes for directing pre-filling fluid to the input holes in the top of the spin-on style filter cartridge assembly. A potential hinged magnetic latching system is depicted.

FIG. 13 is a sectional view of a potential alternate embodiment of this patent disclosure. Item 1308 is the funnel assembly. Item 1308 is made from a flexible material like plastic that has flexible properties. Item 1308 is shown after being pulled or pushed against the top of filter cartridge assembly 10. Item 1308's shape is shown in the elastically deformed position allowing the bottom surface of funnel assembly 1308 to touch and press against spin-on filter cartridge assembly seal 16. Item 1310 is the funnel like fluid collection area. Item 1304 is a funnel input port hole or slot for directing fluid from the funnel collection area 1310 to filter input hole 14. Item 1304 can exist singularly or in an array of polarly oriented features. Item 1322 is a latch support mount depicted as a clevis with a through hole molded into the surface of item 1308. Item 1322 can exist singularly or in plurality. Item 1322 can be positioned anywhere within the funnel assembly 1308's upper surface. Each instance of item 1322 will hold and guide item 1318 magnetic latch holder. Item 1318 is shown as a tie rod style component used for connecting item 1308 through support mount 1322 to magnet 1328 which is mounted so it can swivel on a pin supported by a clevis arrangement in this embodiment. Magnet 1328 is used for latching and connecting item 1308 axially to a magnetic surface of filter assembly 10. The latching action of magnet item 1328 is actuated manually by pressing down on 1308 and then allowing magnets 1328 to engage a magnetic surface of filter assembly 10. Item 1314 is an optional vent that would allow air to escape filter output hole 12.

Figure 14:
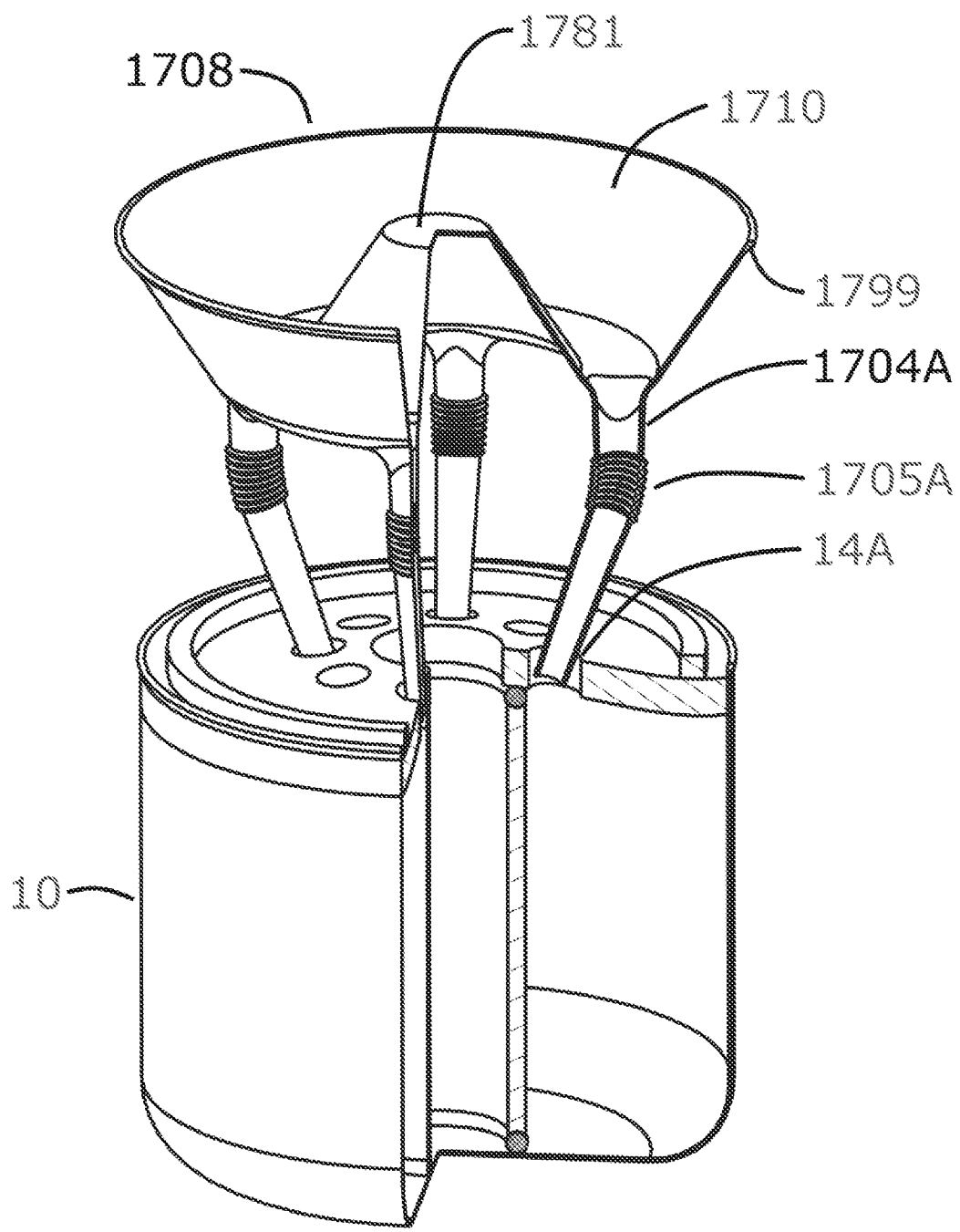
FIG. 14 shows a funnel apparatus and a filter assembly in examples of the present disclosure.

FIG. 14 shows a funnel apparatus and a filter assembly in examples of the present disclosure. Each of the plurality of runner tubes 1704A of the funnel apparatus comprises a flexible section 1705A. Deformation of the flexible section 1705A facilitating insertion of each of the plurality of runner tubes 1704A into a corresponding input port hole 14A. A centerline of each of the plurality of runner tubes 1704A is not aligned with a centerline of the corresponding input port hole 14A.

Figure 15:
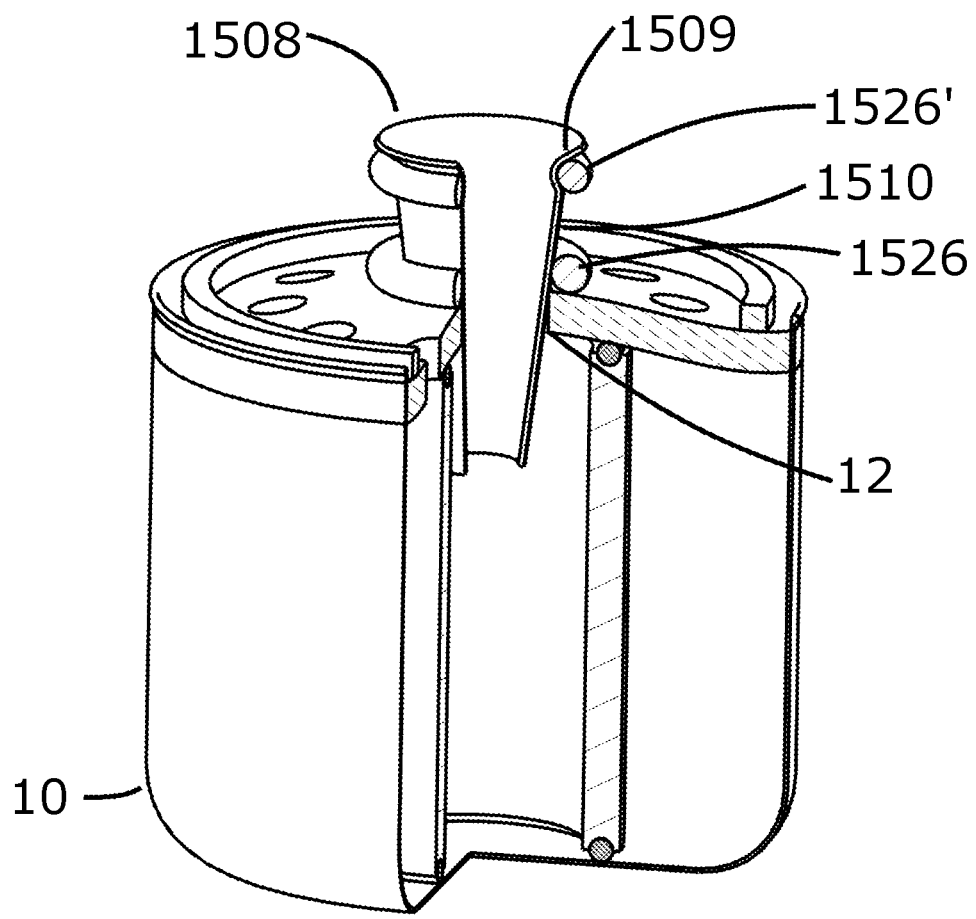
FIG. 15 illustrates a potential conical diverter embodiment of the proposed invention. An elastomeric seal is included to further prevent fluid from entering the output port holes of the filter cartridge assembly. It includes a preformed groove in the top of the conical diverter for safely storing the elastomeric seal when the diverter is not in use.

FIG. 15 is a cross section view of a potential alternative embodiment of the apparatus disclosed by this invention. Item 1508 is a diverter assembly that consists of item 1510 diverter cone and item 1526 an optional seal. Item 1510 is a thin sectioned cone shaped diverter. Item 1510 has a conical or spherical and smooth or stepped derived external surface that will mate with varying sizes of filter output hole 12. Item 1526 is an optional round cross section annularly shaped ring that wraps around item 1510. Item 1526 is made from a soft elastic material that has a natural inside diameter that allows it to fit tightly to the smaller diameter of diverter cone 1510. Groove 1509 is used to store seal 1526 when not in use. Groove 1509 can be positioned anywhere on item 1510 including on the internal surface. Item 1526 and item 1509 can exist singularly or in pluralities to cover more size ranges of filter output holes. Item 1526' depicts optional seal item 1526 in an alternate position during storage. Item 1510's external conical surface will mate with bore output hole 12 to gate and prevent the flow of prefilling fluid into filter output hole 12. Seal item 1526 can be translated down the external surface of diverter cone 1510 to mate with the output hole bore surface to provide improved fluid flow gating of the filter output hole 12.

Figure 16:
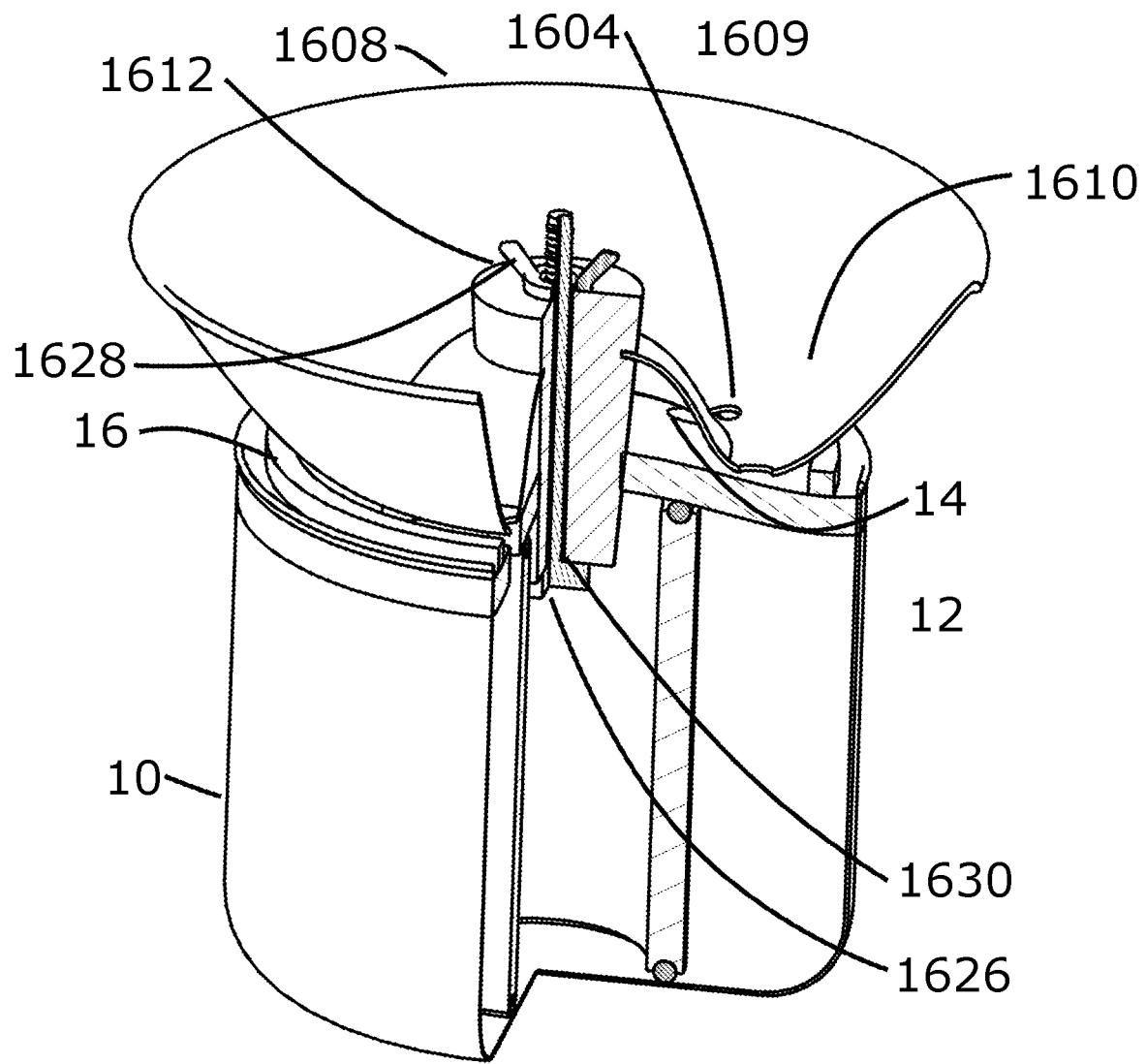
FIG. 16 illustrates an annular funnel arrangement with polarly oriented holes for directing prefilling fluid to the input holes in the top of the spin-on style filter cartridge assembly. A potential expanding plug is included for latching and preventing fluid from entering the center fluid output port hole. The expanding plug is expanded and energized with the aid of a helically threaded fastener.

FIG. 16 is a sectional view of an alternate embodiment of this disclosure. Item 1608 is the funnel assembly. Item 1610 is the funnel component made from a flexible material like plastic that has elastic properties. Item 1610 is shown after being pushed against the top of filter cartridge assembly 10. Item 1612 is a cylindrical or conically shaped diverter plug with a smooth or stepped outer surface for mating with the internal bore of filter output hole 12. Item 1612 is composed from an elastic material like rubber that will expand in a direction opposite of a compressive force. Item 1612 has a through hole 1630. Through hole 1630 houses a tension device 1626. Tension device 1626 is used to apply a compressive force between the top and bottom surface of diverter plug 1612. The force in tension device 1626 is created and retained by tension device actuator 1628. Item 1628 is shown as a helically threaded wing nut. Item 1628 could alternatively create load on tension device 1626 with a cam style actuator arrangement. Item 1604 is a funnel input port hole or slot for directing filter prefilling fluid from the funnel collection area to filter input hole 14. Item 1604 can exist singularly or in an array of polarly oriented features. Item 1610 can be shaped to engage filter seal 16 to prevent prefilling fluid from pouring over the outside of filter assembly 10.

Figure 17:
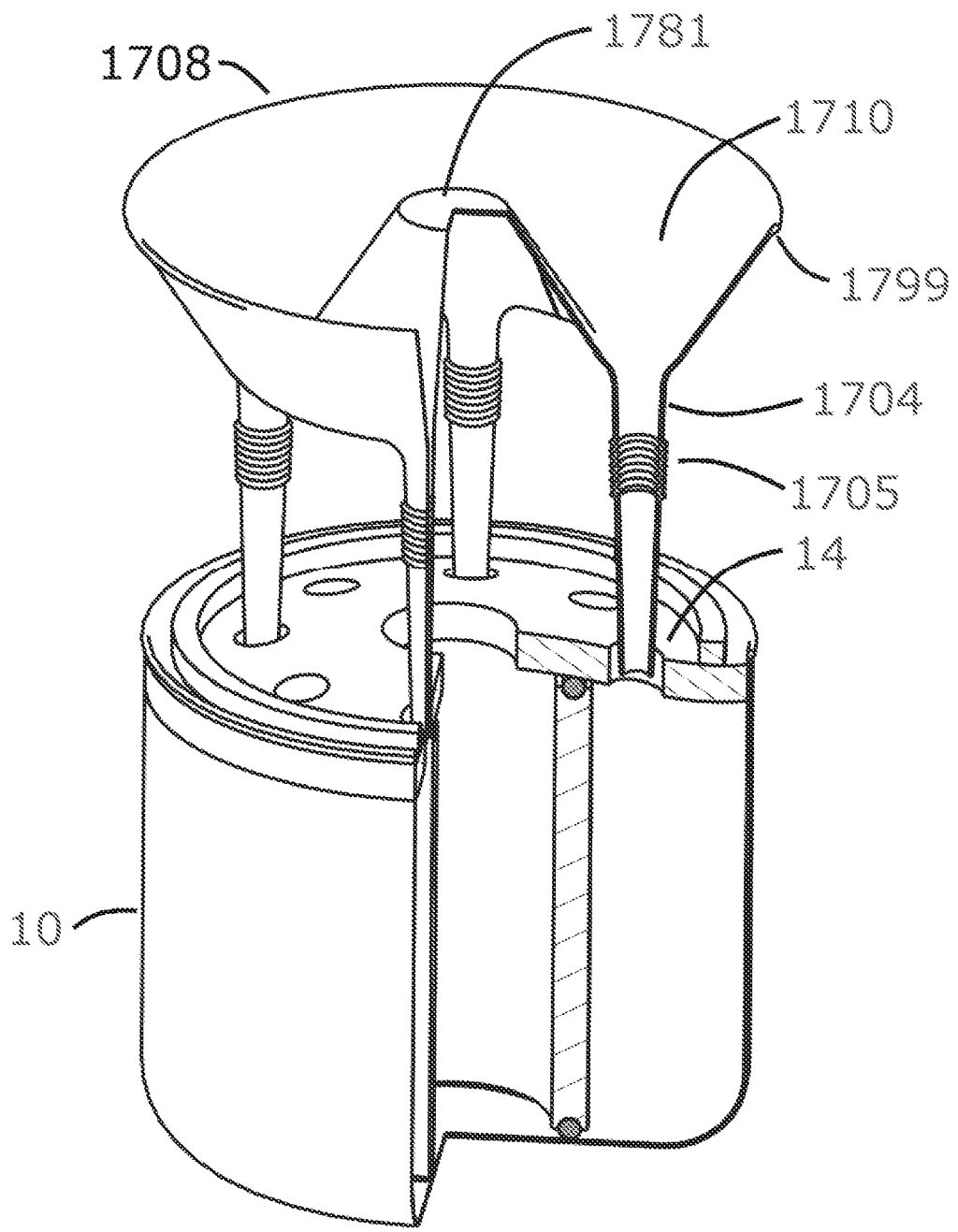
FIG. 17 illustrates an annularly shaped conical funnel assembly with a plurality of polarly oriented tubes or channels for directing the prefilling fluid to the filter cartridge assembly input port holes.

FIG. 17 includes a sectioned view of an alternate embodiment of this patent disclosure that includes options for channels or runners for collecting and conveying prefilling fluid directly to item 10 spin-on cartridge filter assembly's input port holes 14. Item 1708 is the funnel assembly that can be ideally produced from an elastic material like plastic or rubber and that could have a uniform hardness or could vary in durometer throughout. Item 1710 is the funnel assembly's fluid collection area. Item 1704 is one of any plurality of channel or runner tubes with four depicted in this embodiment. Item 1705 is an optional feature that could be applied to the inner, outer or both surfaces of any number of 1704 funnel runner channel tubes. Item 1705 is produced with a series of interconnected folds, ribs, grooves, facets or frustra shapes that will allow the funnel runners to bend for engaging varying sizes of filter assemblies without buckling or closing off the funnel runner flow path. Optional feature 1705 could be formed, folded or hot or cold molded into the material of funnel runner 1704. Item 1704 filters runners or channels may typically all be identical on a single funnel assembly 1708, and they could also be mixed with any combination of variations from one runner to another on a funnel assembly.

Figure 18:
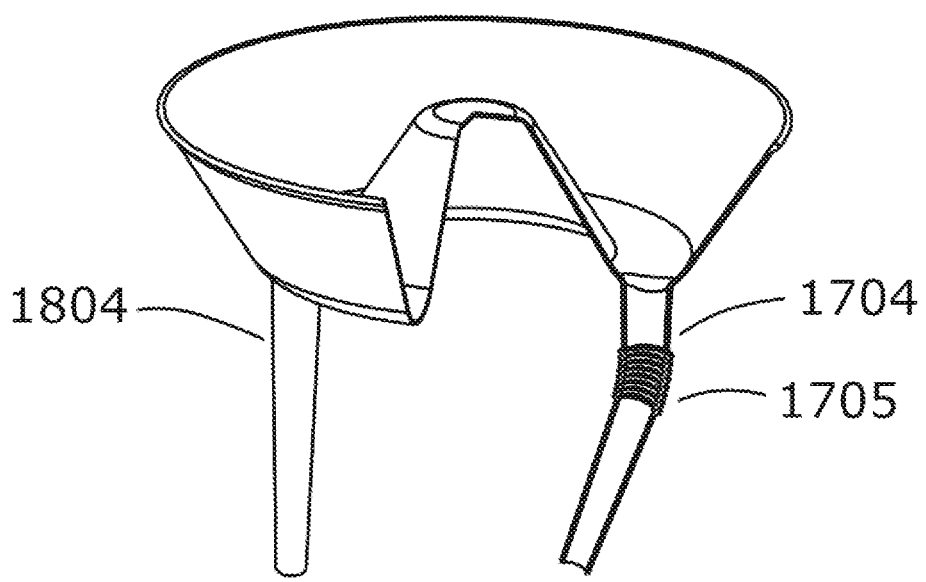
FIG. 18 illustrates an annularly shaped sectioned view of the conical funnel assembly with a plurality of polarly oriented runner tubes each with or without a flexible section in examples of the present disclosure.

FIG. 18 illustrates an annularly sectioned view of the shaped conical funnel assembly with a plurality of polarly oriented runner tubes. Runner tube 1704 includes a flexible section 1705. Runner tube 1804 excludes a flexible section.

I claim:

1. A funnel apparatus, comprising:
   a fluid collection member comprising:
   a rim; and
   a central portion; and
   a plurality of runner tubes extending away from the fluid collection member;
   wherein a lower end of each of the plurality of runner tubes is configured to be inserted into a respective input port hole of a plurality of input port holes of a filter assembly, and
   each of the plurality of runner tubes comprises:
   a flexible section comprising,
   a first plurality of frustra shapes on an outer surface of each of the plurality of runner tubes; and
   a second plurality of frustra shapes on an inner surface of each of the plurality of runner tubes.

2. The funnel apparatus of claim 1, wherein the funnel apparatus is made of a plastic material.

3. The funnel apparatus of claim 1, wherein the funnel apparatus is made of a rubber material.

4. The funnel apparatus of claim 1, wherein the central portion of the fluid collection member of the funnel apparatus is of a cone shape.

5. The funnel apparatus of claim 4, wherein a top of the cone shape is lower than a top of the rim of the fluid collection member of the funnel apparatus.

6. The funnel apparatus of claim 1, wherein each of the plurality of runner tubes comprises:
   a proximal end connected to the fluid collection member; and a distal end away from the fluid collection member, wherein a diameter of the proximate end is larger than a diameter of the distal end.

7. The funnel apparatus of claim 1, wherein the plurality of runner tubes comprises:
 a first runner tube;
 a second runner tube;
 a third runner tube; and
 a fourth runner tube, wherein the plurality of runner tubes is equally spaced along a circumferential perimeter.

8. The funnel apparatus of claim 1, wherein the funnel apparatus is made of an elastic material with varying durometer.

9. A funnel apparatus, comprising:
 a fluid collection member comprising:
  a rim; and
  a central portion; and
 a plurality of runner tubes extending away from the fluid collection member, wherein:
 a lower end of each of the plurality of runner tubes is configured to be inserted into
 a respective input port hole of a plurality of input port holes of a filter assembly;
 each of the plurality of runner tubes comprises a flexible section;
 the funnel apparatus is characterized by a first mounting condition in which the funnel apparatus is mounted on a first filter assembly comprising:
  a first plurality of input port holes;
  a centerline of the funnel apparatus is aligned with a centerline of the first filter assembly;
  a lower section of each of the plurality of runner tubes is inserted into a respective input port hole of the first plurality of input port holes; and
  the first plurality of input port holes are equally spaced along a first circumferential perimeter;
 a second mounting condition in which the funnel apparatus is mounted on a second filter assembly comprising:
  a second plurality of input port holes;
  a centerline of the funnel apparatus is aligned with a centerline of the second filter assembly;
  a lower section of each of the plurality of runner tubes is inserted into a respective input port hole of the second plurality of input port holes; and
  the second plurality of input port holes are equally spaced along a second circumferential perimeter; and
 wherein a diameter of the first circumferential perimeter is larger than a diameter of the second circumferential perimeter.

* * * * *